United States Patent

Lang et al.

[15] 3,650,839
[45] Mar. 21, 1972

[54] FUEL CELL BATTERY

[72] Inventors: Maurice Lang, Massapequa, N.Y.; Renato Di Pasquale, Paramas, N.J.

[73] Assignee: Yardney International Corp., New York, N.Y.

[22] Filed: July 1, 1968

[21] Appl. No.: 741,634

[52] U.S. Cl. ............................................................136/86
[51] Int. Cl. ..................................................H01m 29/04
[58] Field of Search....................................................136/86

[56] References Cited

UNITED STATES PATENTS

| | | |
|---|---|---|
| 3,378,406 | 4/1968 | Rosansky...................................136/86 |
| 3,432,353 | 3/1969 | Von Krusenstierna et al. .........136/86 |
| 3,061,658 | 10/1962 | Blackmer..................................136/86 |
| 3,442,714 | 5/1969 | Matsuno...................................136/86 |
| 3,462,307 | 8/1969 | Voorhies et al..........................136/86 |
| 3,476,609 | 11/1969 | Gelting et al. ...........................136/86 |

*Primary Examiner*—Allen B. Curtis
*Attorney*—Karl F. Ross

[57] ABSTRACT

Several fuel cells, each comprising a metal electrode in a gas-permeable envelope electrode with a catalytically effective inner surface, are juxtaposed to form a battery and are separated by solid spacers which are carried on an interposed partition or project directly from confronting outer surfaces of adjoining envelope electrodes to form channels for the admission of air or oxygen to the respective cells.

1 Claims, 6 Drawing Figures

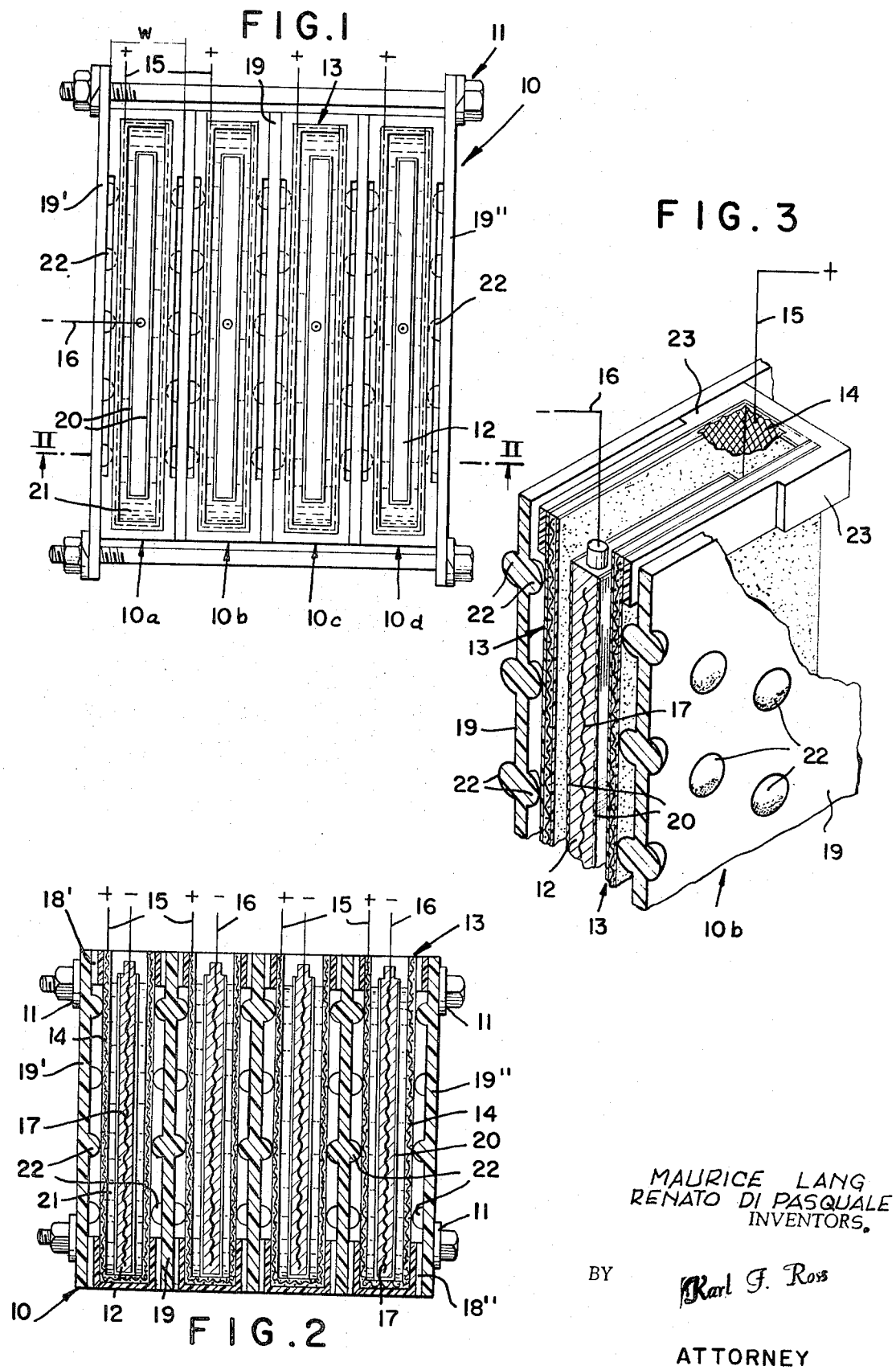

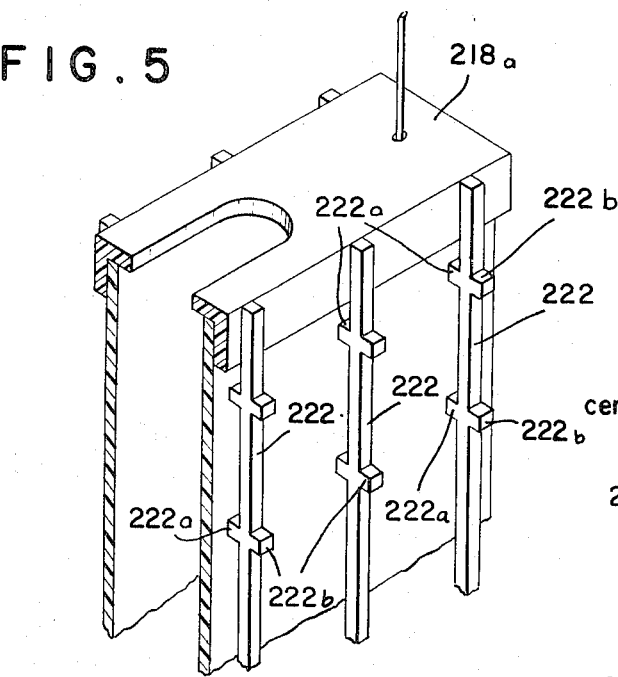
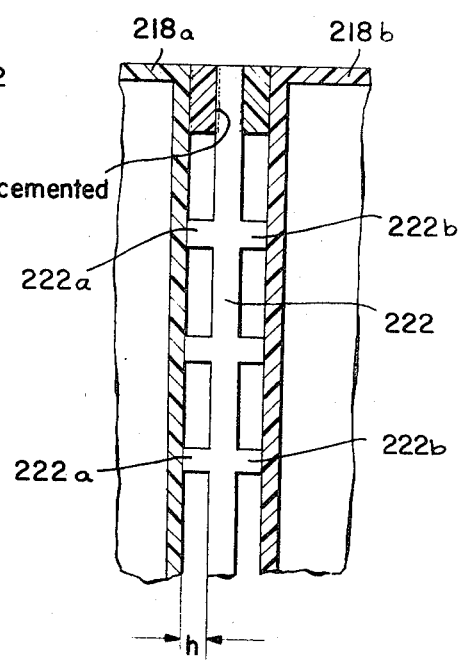
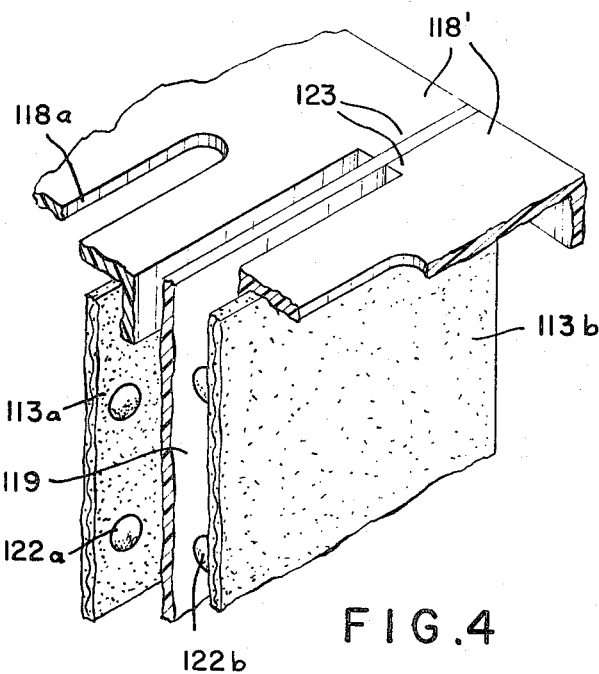
MAURICE LANG
RENATO DI PASCUALE
INVENTORS,
BY Karl F. Ross
ATTORNEY

FUEL CELL BATTERY

Our present invention relates to a fuel-cell battery with a plurality of juxtaposed cells each comprising a metallic inner electrode in a gas-permeable outer envelope electrode, e.g., as described in commonly assigned application 31,873 filed May 4, 1970 which is a continuation of Ser. No. 664,151 filed 21 Aug. 1967, now abandoned, by Renato Di Pasquale and Frank Solomon.

In such fuel cells it is necessary to ensure that a depolarizing gas, such as air or oxygen, can reach the interior of each cell through the interstices of the permeable envelope in sufficient quantities to maintain a high rate of interaction with the electrolyte therein, such interaction being promoted by a catalyst coated onto the inner surface of the envelope or incorporated in the usually dielectric (e.g., resinous) matrix thereof so as to be available at the interface between the gas stream and the liquid electrolyte. With the metallic counterelectrode constituted by a consumable zinc plate, for example, the catalyst may consist of carbon particles admixed with Teflon in the manufacture of the sheet material from which the envelope electrode is formed, the ratio of carbon to Teflon increasing throughout the thickness of the envelope from its outer to its inner surface so that the outer surface is relatively hydrophobic while the inner surface is relatively hydrophilic; as likewise described in the above-identified application, the carbon particles may be metalized for improved catalytic action.

The need for making available a copious supply of gas conflicts with the requirement for compactness of the assembly of juxtaposed cells. Moreover, the tendency of the organic envelope to swell upon contact with the electrolyte further militates against a close juxtaposition of the cells, especially where these cells are serially interconnected so that short-circuiting intercell contact must be avoided.

The general object of our present invention is to provide an improved cell assembly of the type referred to which satisfies the aforestated desiderata of ensuring an adequate gas supply to each cell, affording a compact construction and preventing internal short circuits.

These objects are realized, pursuant to a feature of our present invention, by the provision of a solid partition between each pair of adjoining cells, this partition establishing separate gas channels for the two cells and being provided with spacer formations which engage the outer surfaces of the associated cell envelopes to maintain a predetermined width of each channel. It is also possible to provide these spacer formations directly on the confronting outer envelope surfaces on opposite sides of the interposed partition.

In accordance with another important aspect of this invention, the interposed spacing means forms part of a structure which, together with a pair of rigid frame members encircling the top and the bottom of the envelope electrode of each cell, insures a precise dimensioning of the overall cell assembly irrespective of any changes in the wall thickness of the envelopes. This effect is independent of the presence of absence of a solid partition; without such partition of insulating material, however, the separation of the cells may have to be made somewhat greater, or the intercell spacers may have to be more densely arrayed, if the risk of shorting between cells is to be positively excluded. The two frame members of each cell may or may not be interconnected by means other than the envelope electrode. The lower frame member may be generally trough-shaped, forming a closed bottom to hold the liquid electrolyte inside the cell; the upper frame member may be open or may be a partly closed cap with one or more apertures for the introduction of the electrolyte and for the escape of evolving gases.

The invention will be described in greater detail with reference to the accompanying drawing in which:

FIG. 1 is a top view of a cell assembly according to the invention;

FIG. 2 is a cross-sectional view of the assembly of FIG. 1, taken on the line II—II thereof;

FIG. 3 is a fragmentary perspective view of one of the cells shown in FIGS. 1 and 2;

FIGS. 4 and 5 are fragmentary perspective views generally similar to FIG. 3, illustrating modifications; and FIG. 6 is a fragmentary cross-sectional view of two adjoining cells embodying the construction of FIG. 5.

The electrochemical energy generator shown in FIGS. 1–3 is an air/zinc battery 10 composed of a multiplicity of substantially identical cells 10a, 10b, 10c, 10d juxtaposed under pressure within a yoke 11.

As particularly illustrated for the cell 10b in FIG. 3, each cell comprises a negative zinc electrode 12 wrapped in a permeable or semipermeable separator sheet 20 and positioned upright in an envelope electrode 13 of polymeric sheet material which is pervious to air and is composed of a mixture of a hydrophobic resin and a catalytic agent. This sheet material may be prepared, as described in the aforementioned application Ser. No. 664,151 and in another commonly assigned application, Ser. No. 601,546 filed 14 Dec. 1966, now abandoned, by Allen Charkey and Renato Di Pasquale, by admixing pure or metal-plated carbon powder with an agueous emulsion of Teflon to form a paste, drying this paste at a temperature of about 60 to 250 C. and then curing the dry mixture by heating it to a temperature of about 150° to 350° C. in the substantial absence of air, together with a thermally destructible filler such as a glycol which vaporizes at the curing temperature without leaving an undesirable residue in the resulting sinter body; this curing step may also be used to laminate the porous structure, rolled or pressed into sheet form, onto a metallic support such as a nickel grid 14 imbedded between two such sheets and joined to a terminal lead 15. The weight ratio of plain or metalized (e.g., platinum-coated) carbon to Teflon may range from about 10:1 on the inner envelope surface to about 1:1 on the outer surface, the latter surface being thus highly hydrophobic whereas the inside of the envelope is hydrophilic and catalytically active.

Output lead 15, during operation, delivers a positive voltage with reference to the potential of a negative lead 16 connected to a conductive grid 17 imbedded in zinc plate 12. The prismatic air electrode 13, 14 is connected at the top and the bottom to a pair of members 18', 18'' of frame rigid dielectric, preferably plastic material, e.g., polystyrene. The upper frame members 18' are shown as upwardly open collars while the lower frame members 18'' are closed-bottom troughs preventing the outflow of a liquid electrolyte 21 (e.g., an aqueous KOH solution) present within each cell.

In accordance with an important feature of our invention, each cell is separated from an adjoining cell by a rigid, plate-shaped partition 19 which, resting against shoulders 23 (FIG. 3) of frame members 18', 18'', defines therewith a peripherally open channel for the admission of a depolarizing gas (here specifically air) to the outer surface of the pervious envelope 13. The width of this air channel tends to decrease during operation as the material of envelope 13 begins to swell under the action of the electrolyte 21 present within the envelope 13. In order to maintain a desired minimum width for each air channel, we provide the partition 19 with formations 22 bearing upon the outer surface of each adjoining envelope 13; as specifically illustrated, these formations are generally hemispherical projections integral with the partition and distributed over both its major surfaces. The plate 19 may consist of plastic or other dielectric material similar to or identical with that of the frame members 18', 18''.

While each of the inner cells 10b, 10c is flanked by a pair of such partitions 19, the two outermost cells 10a and 10d are confronted on the outside by end plates 19', 19'' having projections 22 only on their inner surfaces. These end plates 19', 19'' bear upon the outermost pairs of frame members 18', 18'' whereas each partition 19 is bracketed between two pairs of such frame members. Thus, the frame members 18', 18'' and the plates 19, 19', 19'' form a stack of predetermined dimensions subdivided into a plurality of upwardly, downwardly and laterally open compartments for the several cells 10a–10d. The invariable width of each compartment, corresponding to the frame width $w$ (FIG. 1), is sufficient to accommodate an envelope electrode 13 and a counterelectrode 12 with initial clearance for the admission of electrolyte and lateral space for the flow of air to the outer envelope surfaces, the width of this lateral space being determined by the depth of the projections 22 which substantially equals the thickness of frame members 18', 18" at their shoulders 23.

In holding the air-permeable sheet 13 at a predetermined distance from the adjoining dielectric plates 19, 19', 19", the spacers 22 also tend to maintain the inner surface of the swollen sheet in contact with the zinc plate 12 through the intermediary of separator 20, thereby resisting any substantial deformation of this electrode during discharge.

The flow of air or oxygen through the peripheral gaps defined by shoulders 23 may be promoted, if necessary, by pumps or other force-feed means not shown. The assembly shown in FIGS. 1-3 may be placed in an outer receptacle, not illustrated, and may of course be enlarged or reduced as to the number of its cells. The leads 15, 16 of adjoining cells may be connected in a series circuit, though a parallel connection is also possible; owing to the interposition of insulating partitions 19, there is no danger of internal short circuits due to a formation of electrolyte bridges between the several cells.

In FIG. 4 we have shown part of a modified cell assembly according to the invention wherein the upper frame members 118', clamping a dielectric partition 119 between their corner shoulders 123, form partly closed caps with apertures 118a which serve for the filling of the cell with electrolyte and for the venting of its interior. This Figure also illustrates the possibility of leaving the surface of plate 119 smooth and providing the intercell spacers in the form of beads 122a, 122b on confronting surfaces of the envelopes 113a, 113b of adjoining cells. In this embodiment, partitions 119 need not be as strong and rigid as the plates 19 of the preceding Figures.

FIGS. 5 and 6 depict a further modification with omission of the solid intercell partitions. Spacers 222 are shown as vertical stringers cemented onto an edge of an upper frame member 218a (as onto well as a parallel edge of the corresponding lower frame member, not shown) while bearing under pressure, e.g., from a yoke such as the one illustrated at 11 in FIGS. 1 and 2, upon corresponding frame members of an adjoining cell, one such frame member being seen at 218b in FIG. 6. The transversely spaced stringers 222 are formed with vertically spaced enlargements 222a, 222b which rest against the confronting outer surfaces of envelopes 213a, 213b, their height $h$ (FIG. 6) being substantially equal to the thickness of the frame members 218a, 218b.

Frame members 18', 18" etc., could also be metallic, with or without external plastic (e.g., epoxy) coating.

Other modifications readily apparent to persons skilled in the art, e.g., as regards the structural details of the cell frames and the compositions of the electrodes, are also intended to be embraced within the spirit and scope of our invention as defined in the appended claims.

We claim:

1. A fuel-cell battery comprising a plurality of cells each including an envelope electrode of gas-permeable sheet material, a liquid electrolyte in said envelope electrode and a counterelectrode immersed in said electrolyte, said envelope electrode having a catalytically effective inner surface for promoting interaction between said electrolyte and a gas penetrating said sheet material; a solid partition of insulating material interposed between each pair of adjoining cells, said partition forming two separate gas channels alongside the outer surfaces of the envelope electrodes of said adjoining cells and being provided with projections spacedly bearing upon said envelope electrodes; and a pair of rigid frame members projectingly surrounding each envelope electrode at the bottom and the top thereof, respectively, and bearing upon opposite surfaces of the interposed partition at vertically spaced locations, at least one of said frame members of each pair being partly cut away with formation of a pair of horizontally spaced shoulders separated by a gap and maintaining jointly with said projections a predetermined clearance between said envelope electrodes and said partition for making said envelope electrodes accessible to said gas through the spaces between said frame members and through said gap while maintaining said envelope electrodes insulated from each other.

* * * * *